(12) United States Patent
Miyake et al.

(10) Patent No.: US 10,934,183 B2
(45) Date of Patent: Mar. 2, 2021

(54) LIQUID PROCESSING APPARATUS

(71) Applicant: Panasonic Intellectual Property Management Co., Ltd., Osaka (JP)

(72) Inventors: Gaku Miyake, Osaka (JP); Genichiro Matsuda, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 88 days.

(21) Appl. No.: 16/274,168

(22) Filed: Feb. 12, 2019

(65) Prior Publication Data

US 2019/0292076 A1 Sep. 26, 2019

(30) Foreign Application Priority Data

Mar. 22, 2018 (JP) .................. 2018-054790

(51) Int. Cl.
*C02F 1/46* (2006.01)
*C02F 1/32* (2006.01)
*H05H 1/48* (2006.01)

(52) U.S. Cl.
CPC .............. *C02F 1/4608* (2013.01); *C02F 1/32* (2013.01); *H05H 1/48* (2013.01); *C02F 2301/026* (2013.01)

(58) Field of Classification Search
CPC ...... C02F 1/46; C02F 1/32; C02F 1/30; C02F 1/72; H05H 1/48; H05H 1/24; H05H 2245/121; H01J 37/32; A61L 2/14; A61L 9/145; A61L 9/22; A61L 2/186; A61L 2/22; A61L 2/208; A61L 9/14; A61L 2202/25; A61L 2209/134; A61L 2209/213; A61L 2202/11; A61L 2202/122; A61L 2202/15; B05B 7/2494; B05B 17/04; B05B 7/2491

See application file for complete search history.

(56) References Cited

U.S. PATENT DOCUMENTS

| | | | |
|---|---|---|---|
| 2013/0192979 A1* | 8/2013 | Xu | H05H 1/48 204/164 |
| 2014/0054241 A1 | 2/2014 | Foret | |
| 2015/0239759 A1 | 8/2015 | Kang | |

(Continued)

FOREIGN PATENT DOCUMENTS

| | | |
|---|---|---|
| JP | 2006-130410 | 5/2006 |
| JP | 2007-207540 | 8/2007 |

(Continued)

*Primary Examiner* — Cameron J Allen
(74) *Attorney, Agent, or Firm* — Wenderoth, Lind & Ponack, L.L.P.

(57) ABSTRACT

A liquid processing apparatus includes a processing tank, a liquid introduction port, a discharge portion, a first electrode, a second electrode, and a power supply. The liquid introduction port is disposed on a first end side of the processing tank, causes a liquid to swirl in the processing tank by introducing the liquid into the processing tank in a tangential direction of the processing tank, and generates a gas phase in a swirling flow of the liquid. The first electrode has a rod shape and is disposed at the first end on a central axis of the processing tank. The second electrode is disposed so as to be exposed to the discharge portion of the processing tank. A voltage is applied between the first electrode and the second electrode to generate plasma in the gas phase.

4 Claims, 16 Drawing Sheets

(56) References Cited

U.S. PATENT DOCUMENTS

| | | | |
|---|---|---|---|
| 2016/0145123 A1 | 5/2016 | Lai et al. | |
| 2016/0325991 A1 | 11/2016 | Fridman et al. | |
| 2017/0291830 A1* | 10/2017 | Kang ...................... | C02F 1/30 |
| 2018/0230027 A1 | 8/2018 | Miyake et al. | |

FOREIGN PATENT DOCUMENTS

| | | |
|---|---|---|
| JP | 2009-018008 | 1/2009 |
| JP | 2012-77955 | 4/2012 |
| JP | 2012-228644 | 11/2012 |
| JP | 2017-225965 | 12/2017 |

* cited by examiner

FIG. 2
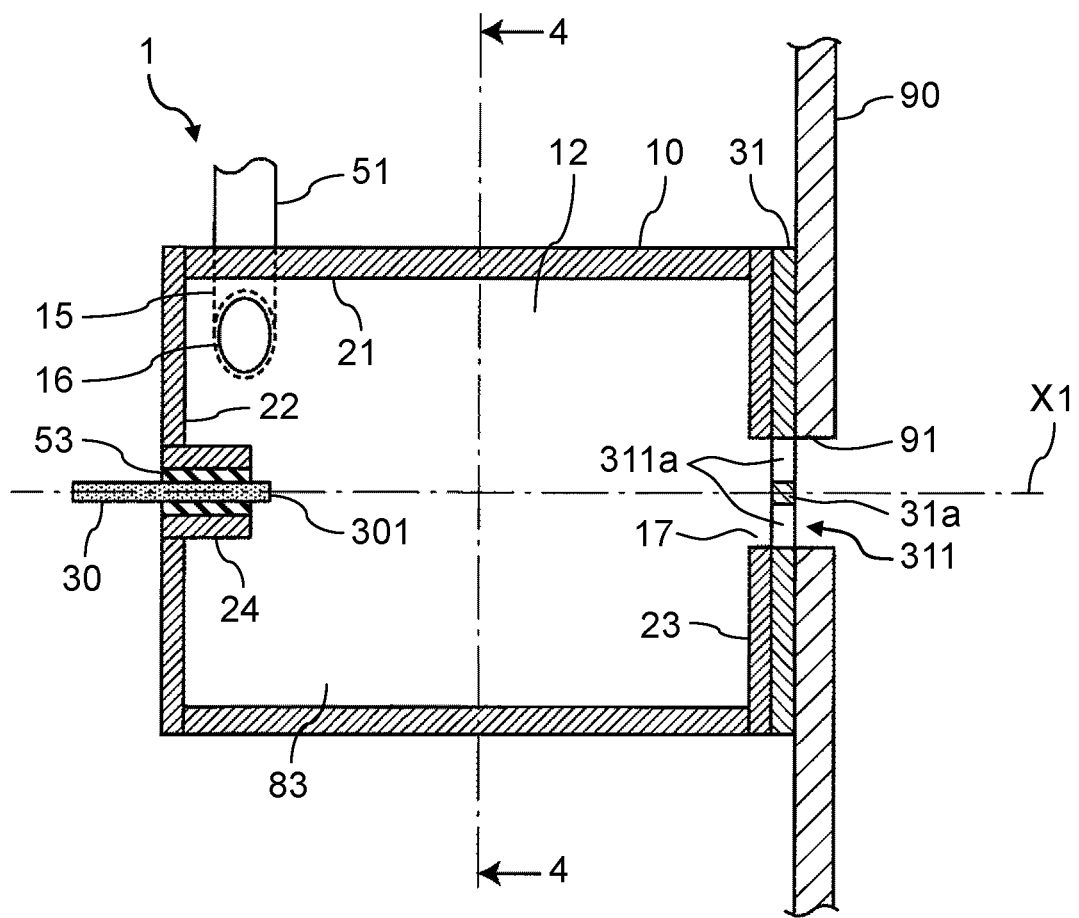
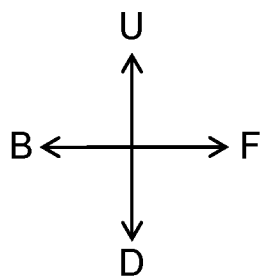

FIG. 8

| CONDITION | LINE WIDTH [mm] | NUMBER OF FAN-SHAPED OPENINGS [EACH] | SHAPE OF OPENING PORTION | OPENING RATIO [%] | WHETHER OR NOT DISCHARGE IS PERFORMED |
|---|---|---|---|---|---|
| 1 | 0 | 1 | ○ | 100 | ○ |
| 2 | 0.3 | 2 | ⊖ | 87.3 | ○ |
| 3 | 0.3 | 4 | ⊕ | 74.6 | ○ |
| 4 | 0.3 | 6 | ✳ | 61.9 | ○ |
| 5 | 0.3 | 8 | ✳ | 49.2 | × |
| 6 | 0.6 | 2 | ⊖ | 74.7 | ○ |
| 7 | 0.6 | 4 | ⊕ | 49.4 | ○ |
| 8 | 0.6 | 6 | ✳ | 24.1 | × |
| 9 | 1 | 2 | ⊖ | 58.4 | ○ |
| 10 | 1 | 4 | ⊕ | 16.7 | × |

FIG. 11
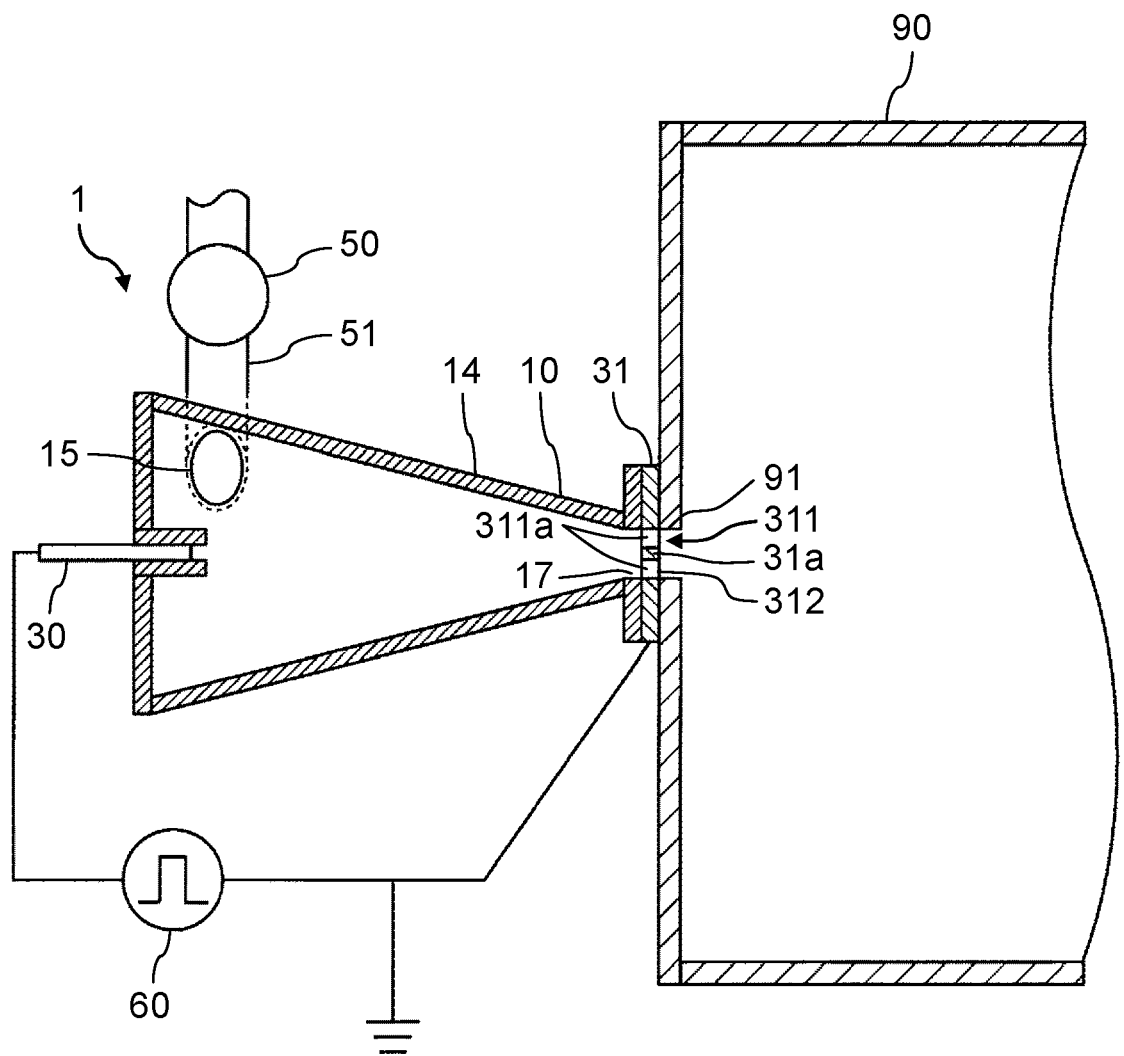
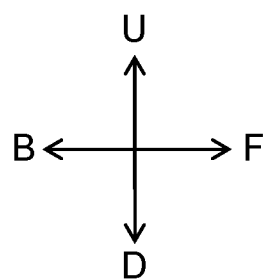

FIG. 12
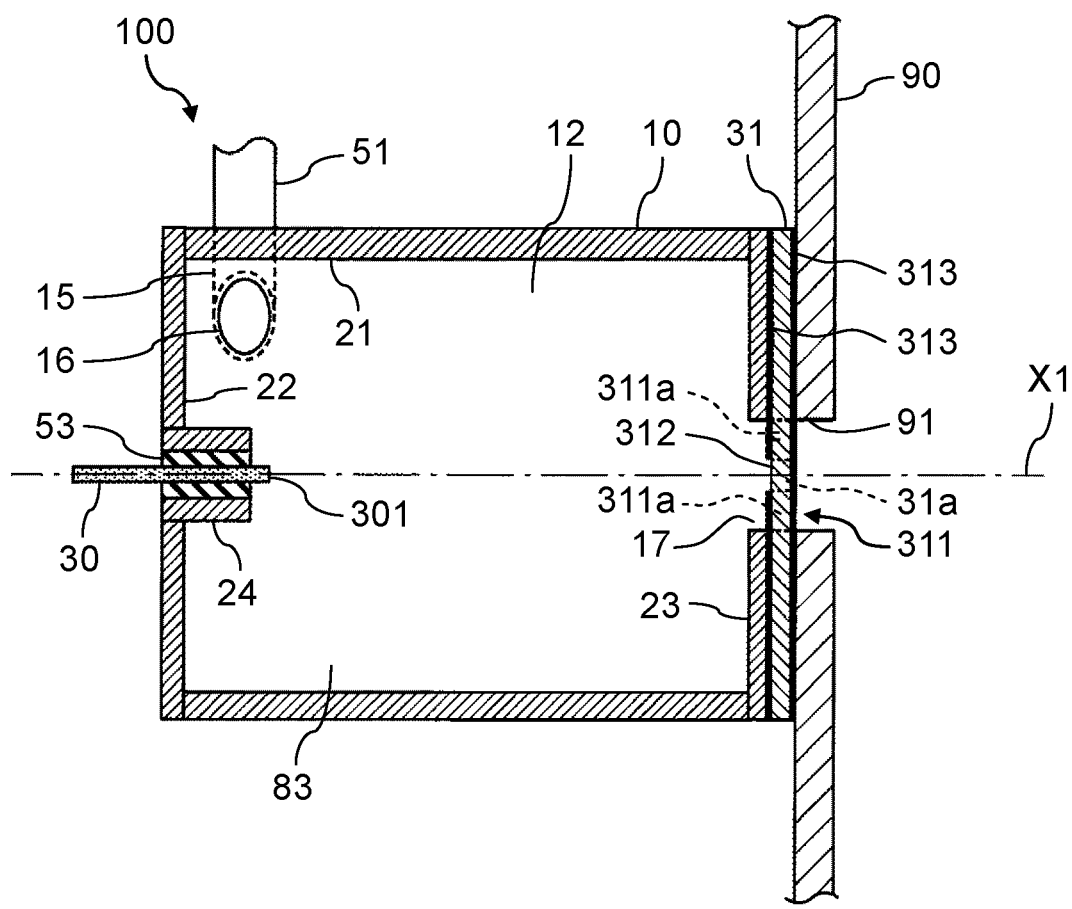
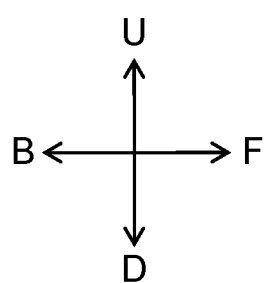

FIG. 15
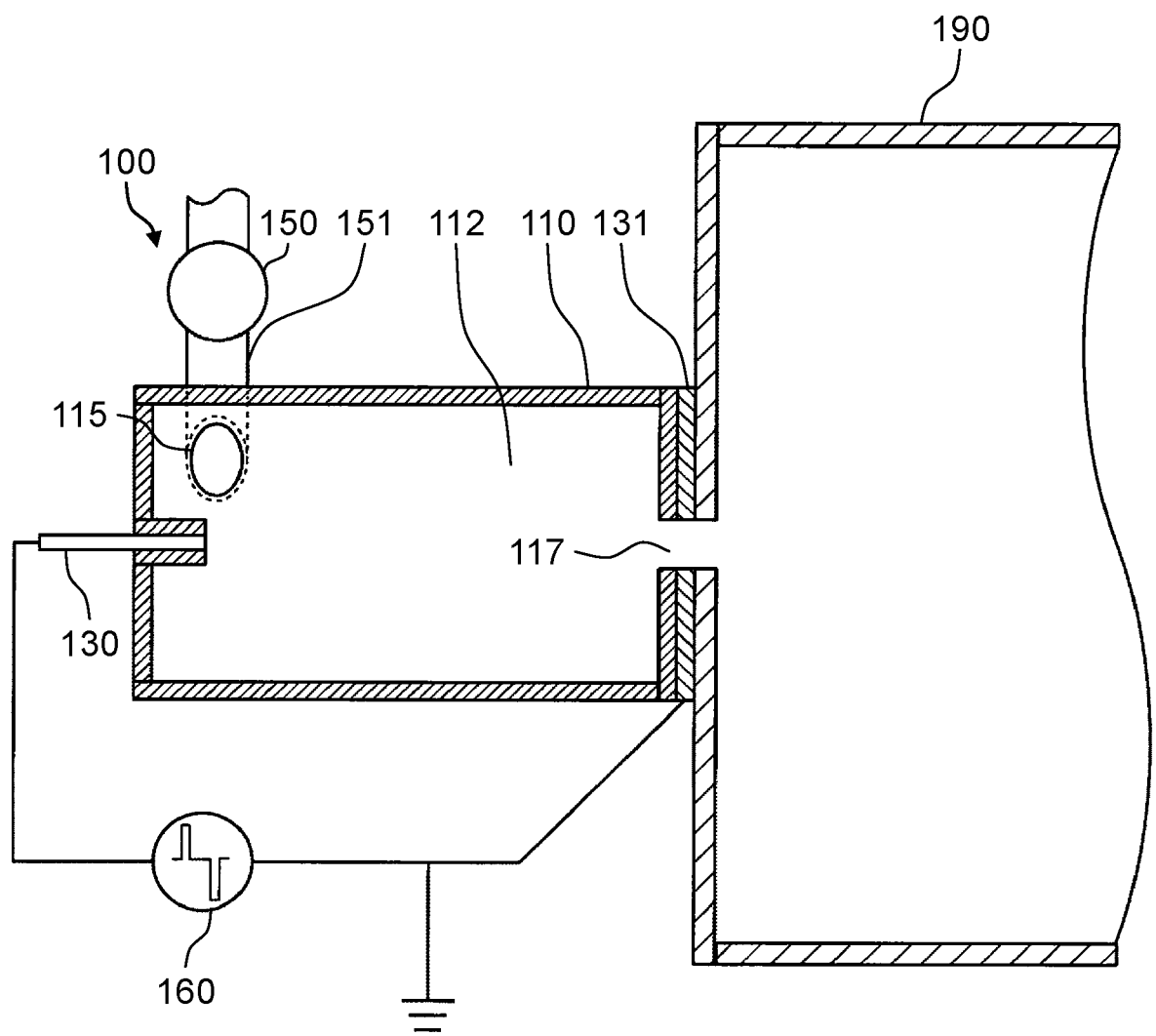
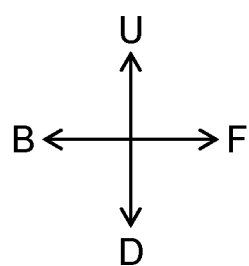

LIQUID PROCESSING APPARATUS

BACKGROUND

1. Technical Field

The present disclosure relates to a liquid processing apparatus for electrochemically processing a liquid. More specifically, the present disclosure relates to a liquid processing apparatus for processing a liquid by simultaneously generating decomposing and sterilizing action by direct contact between contaminants or bacteria contained in the liquid and plasma by generating the plasma in the liquid, and the decomposing and sterilizing action by ultraviolet light, radicals, or the like generated by plasma discharge.

2. Description of the Related Art

FIG. 15 illustrates an example of a liquid processing apparatus of the related art described in Japanese Patent Unexamined Publication No. 2017-225965. Liquid processing apparatus 100 includes apparatus body 110, liquid supplier 150, pipe 151, storage tank 190, and power supply 160. Apparatus body 110 includes processing tank 112, introduction portion 115, discharge portion 117, first electrode 130, and second electrode 131.

FIG. 16 is a view illustrating a state where the liquid processing apparatus of the related art operates. Liquid L1 (for example, water) is introduced from introduction portion 115 provided in a tangential direction of cylindrical processing tank 112 to generate swirling flow F1. A pressure in a vicinity of central axis X1 of processing tank 112 is lowered to a saturated water vapor pressure or less by swirling flow F1. As a result, water vapor is generated by vaporizing a part of liquid L1 in the vicinity of central axis X1 and thereby gas phase G is generated. The plasma discharge is generated in gas phase G by applying a high voltage between first electrode 130 and second electrode 131. In this case, the plasma comes into direct contact with liquid L1, so that the contaminants or the like contained in the liquid L1 are decomposed. At the same time, for example, components having oxidizing power such as hydroxyl radical (OH radical) and hydrogen peroxide are generated and the decomposition process progresses even if these components react with the contaminants or the like contained in the liquid L1. Among the radicals generated by the generation of the plasma in liquid L1, OH radicals are known to have high oxidizing power in particular, and it is possible to decompose hardly decomposable organic compounds dissolved in the liquid L1. Further, gas phase G containing an oxidation component in the vicinity of discharge portion 117 is sheared by receiving a resistance of liquid L in storage tank 190, and generates bubbles B containing the oxidation component. Since not only the oxidation components such as OH radicals and hydrogen peroxide but also bubbles B are contained in processing liquid L2, it is possible to more efficiently decompose contaminants and the like contained in the liquid L1.

SUMMARY

A liquid processing apparatus includes a processing tank, a liquid introduction port, a discharge portion, a first electrode, a second electrode, and a power supply.

The processing tank is provided to be cylindrical such that one end portion is closed and a cross-sectional shape is circular.

The liquid introduction port is disposed on a first end side of the processing tank, causes a liquid to swirl in the processing tank by introducing the liquid into the processing tank in a tangential direction of the processing tank, and generates a gas phase in a swirling flow of the liquid.

The discharge portion is disposed at a second end of the processing tank and discharges the liquid introduced from the liquid introduction port.

The first electrode has a rod shape and is disposed at the first end on a central axis of the processing tank.

The second electrode is disposed so as to be exposed to the discharge portion of the processing tank.

The power supply applies a voltage between the first electrode and the second electrode to generate plasma in the gas phase between the first electrode and the second electrode.

BRIEF DESCRIPTION OF THE DRAWINGS

FIG. 2 is a side sectional view of an apparatus body according to Exemplary Embodiment 1;

FIG. 8 is a table for explaining a relationship between an opening ratio and plasma discharge in the liquid processing apparatus according to Exemplary Embodiment 1;

FIG. 11 is a view illustrating a conical processing tank in the liquid processing apparatus according to Exemplary Embodiment 1;

FIG. 12 is a side sectional view illustrating a configuration of a liquid processing apparatus according to Exemplary Embodiment 2;

FIG. 15 is a sectional view of a liquid processing apparatus of the related art.

DETAILED DESCRIPTIONS

Figure 1:
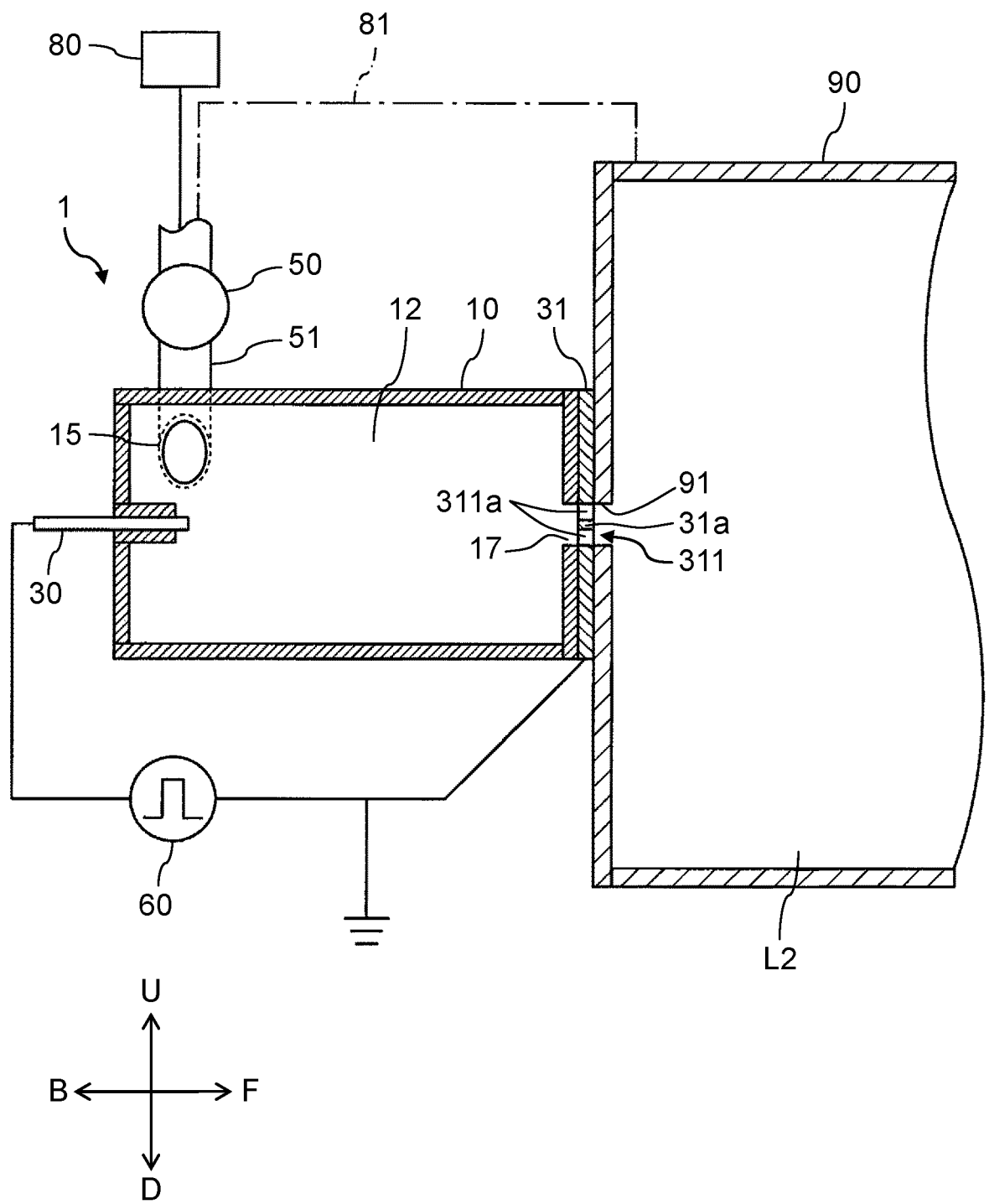
FIG. 1 is a side sectional view illustrating a configuration of a liquid processing apparatus according to Exemplary Embodiment 1.

In a liquid processing apparatus described Japanese Patent Unexamined Publication No. 2017-225965, gas phase G and second electrode 131 are electrically connected via liquid L1. Therefore, when a high voltage is applied between first electrode 130 and second electrode 131, there are two paths through which a current flows. One is a current path that flows through current path r11 passing through the plasma generated in gas phase G from first electrode 130, and then flows from the vicinity of discharge portion 117 through current path r21 passing through liquid L1 to second electrode 131. The other is current path r31 that directly flows from first electrode 130 through liquid L1 to second electrode 131. In a case where an electric conductivity of liquid L1 is high, when plasma is generated, a leakage current flowing through current path r31 flowing only through liquid L1 without passing through the plasma increases. When the leakage current increases, energy applied from the power supply is not used for liquid processing but is used for raising a temperature of liquid L1, resulting in a decrease in energy efficiency of the liquid processing. In addition, if the processing is continued for a long time while circulating liquid L1, the temperature of liquid L1 rises, so that a saturated vapor pressure increases and as a result, a pressure of gas phase G rises and the plasma discharge cannot be stably generated.

Exemplary Embodiment 1

Hereinafter, liquid processing apparatus 1 according to an exemplary embodiment of the present disclosure will be described with reference to the drawings in detail. The same reference numerals are given to the same or corresponding portions and description thereof will not be repeated. For ease of explanation, in the drawings referred to below, the configuration is simplified or schematically illustrated, and some configuration members are omitted. In addition, a dimensional ratio between the configuration members illustrated in each drawing does not necessarily indicate an actual size ratio.

Overall Configuration

First, an overall configuration of liquid processing apparatus 1 will be described.

FIG. 1 is a side sectional view illustrating a configuration of liquid processing apparatus 1 according to Exemplary Embodiment 1 of the present disclosure. In the drawings referred to below, arrow F indicates a forward direction of liquid processing apparatus 1 and arrow B indicates a backward direction. Arrow U indicates an upward direction and arrow D indicates a downward direction (see FIG. 1). Arrow R indicates a rightward direction as viewed from the backward direction and arrow L indicates a leftward direction as viewed from the backward direction (see FIG. 4).

Liquid processing apparatus 1 illustrated in FIG. 1 indicates a state of being connected to storage tank 90. Liquid processing apparatus 1 processes a liquid by discharging in a liquid. In Exemplary Embodiment 1, a state where an aqueous solution in which contaminants are dissolved is processed will be described. Processing liquid processed by liquid processing apparatus 1 is stored in storage tank 90.

Liquid processing apparatus 1 includes at least processing tank 12, first electrode 30, second electrode 31, and power supply 60. More specifically, liquid processing apparatus 1 includes apparatus body 10, liquid supplier 50, and power supply 60. Apparatus body 10 includes processing tank 12, introduction portion 15, discharge portion 17, first electrode 30, and second electrode 31. Introduction portion 15 functions as an example of a liquid introduction port. Processing tank 12 is a portion for processing liquid (for example, water) introduced inside. A front sectional shape of processing tank 12 is circular (see FIG. 4). Processing tank 12 has a cylindrical processing chamber having a circular cross-sectional shape along swirling axis X1 (see FIG. 2) of liquid L of processing tank 12. Introduction portion 15 (liquid introduction port) is disposed on one end (first end) of processing tank 12 and discharge portion 17 is disposed at the other end (second end) of processing tank 12. Introduction portion 15 introduces liquid L1 into processing tank 12 from a tangential direction of a circular cross-sectional shape orthogonal to central axis X1 of processing tank 12. Introduction portion 15 communicates with liquid supplier 50 via pipe 51. Discharge portion 17 discharges processing liquid L2 processed in processing tank 12 from processing tank 12. Discharge portion 17 is connected to intake 91 of storage tank 90. A processing liquid discharged from discharge portion 17 is stored in storage tank 90. A material of processing tank 12 may be an insulator or a conductor. In a case of the conductor, it is necessary to interpose an insulator between processing tank 12 and first electrode 30, and between processing tank 12 and second electrode 31. An opening of discharge portion 17 is circular and an inner diameter of the opening of discharge portion 17 is equal to larger than a diameter dimension of a circumscribed circle of opening 311a of opening portion 311 which is described later.

First electrode 30 has a rod shape and is disposed inside processing tank 12.

Second electrode 31 is disposed in a vicinity of discharge portion 17. As an example, in FIG. 1, second electrode 31 is fixed to an outside of a wall surface of processing tank 12 on which discharge portion 17 is formed, specifically, between storage tank 90 and processing tank 12.

First electrode 30 is connected to power supply 60 and second electrode 31 is grounded. A pulse voltage of a high voltage by power supply 60 is applied to first electrode 30 and second electrode 31.

Liquid supplier 50 is, for example, a pump for supplying a liquid (for example, water) in processing tank 12. Liquid supplier 50 is connected to pipe 51. One end of pipe 51 is connected to introduction portion 15 and the other end of pipe 51 is connected in such a manner that stored water containing processing liquid of a liquid supply source (not illustrated) (for example, water tank 80 or a water supply) or storage tank 90 can be circulated (see circulation pipe 81 or the like indicated by an one-dotted chain line of FIG. 1).

Power supply 60 applies a pulse voltage of a positive or negative high voltage of several kV between first electrode 30 and second electrode 31. Power supply 60 can also apply a so-called bipolar pulse voltage that alternately applies a positive pulse voltage and a negative pulse voltage, but applying a monopolar voltage that applies only the positive pulse voltage is better energy efficiency.

Apparatus Body

Figure 3:
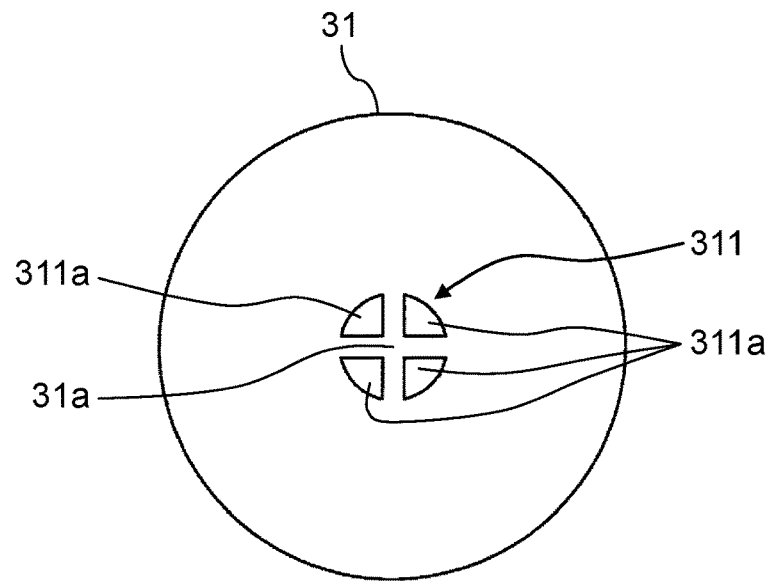
FIG. 3 is a front view of a second electrode according to Exemplary Embodiment 1.

Next, apparatus body 10 will be described in detail. FIG. 2 is a view illustrating a side sectional view of apparatus body 10. FIG. 3 is a front view of second electrode 31.

Processing tank 12 includes first inner wall 21, second inner wall 22, and third inner wall 23. First inner wall 21 is a cylindrical wall portion. Second inner wall 22 is provided at a first end portion of first inner wall 21, for example, at a left end portion of FIG. 2. Third inner wall 23 is provided at a second end portion of first inner wall 21, for example, at a right end portion of FIG. 2. Second inner wall 22 and third inner wall 23 are substantially circular in side view. First inner wall 21, second inner wall 22, and third inner wall 23 constitute substantially cylindrical accommodation space 83 inside processing tank 12. A central axis of first inner wall 21, that is, a virtual central axis of substantially cylindrical accommodation space 83 constituted inside processing tank 12 is central axis X1.

Second inner wall 22 is provided with electrode support cylinder 24. Electrode support cylinder 24 is tubular and extends on a right side (third inner wall side) of FIG. 2. Electrode support cylinder 24 is disposed so that a central axis thereof coincides with central axis X1. First electrode 30 is supported inside electrode support cylinder 24 via insulator 53.

First electrode 30 has a rod shape and insulator 53 is disposed around first electrode 30. First electrode 30 is disposed so that a shaft in a longitudinal direction coincides with central axis X1.

Figure 4:
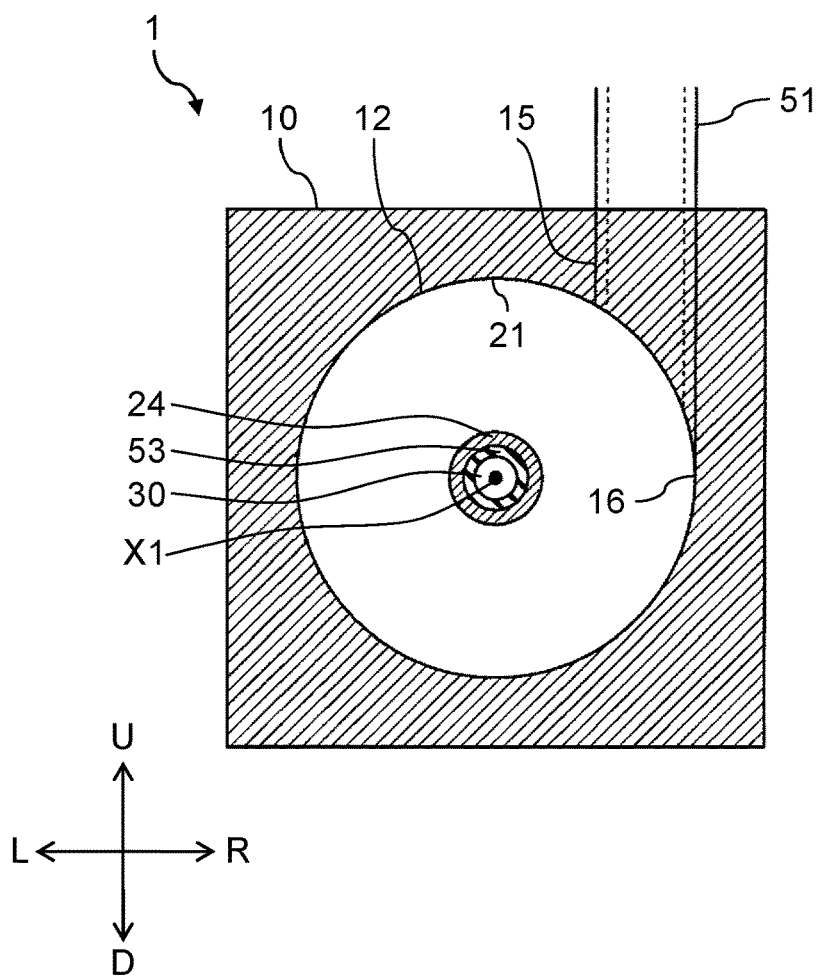
FIG. 4 is a sectional view which is taken along line 4-4 of FIG. 2.

Introduction portion 15 penetrates apparatus body 10. Opening end 16 on one side of introduction portion 15 is formed in first inner wall 21. Introduction portion 15 is disposed at a position adjacent to second inner wall 22 in side view. FIG. 4 is a sectional view which is taken along line 4-4 of FIG. 2. Introduction portion 15 is disposed on the wall surface of first inner wall 21.

Discharge portion 17 penetrates, for example, a center portion of third inner wall 23. The opening of discharge portion 17 is formed such that a central axis thereof coincides with central axis X1.

Second electrode 31 is a plate-shaped metal member. Opening portion 311 penetrates the center portion of second electrode body portion 31a. Opening portion 311 is constituted of a plurality of openings disposed in in a rotation symmetry with respect to second electrode 31 with central axis X1 as a center. Adjacent opening portions 311 are separated from each other via second electrode body portion 31a. FIG. 3 illustrates a front view of second electrode 31 having, for example, opening portion 311. Here, opening portion 311 is constituted of four openings 311a having a shape such that one circular opening is divided into four while leaving second electrode body portion 31a in a cross shape at the center portion of second electrode body portion 31a. In other words, opening portion 311 is constituted of four same fan-shaped openings 311a which are spaced apart from each other.

Cross-shaped second electrode body portion 31a has a function of second electrode 31 partially exposed from the opening of discharge portion 17, and the shape of second electrode body portion 31a is not limited to the cross shape, but as illustrated in FIG. 8 which is described later, the shape may be a linear shape including a rod shape disposed so as to straddle the opening of discharge portion 17 as in conditions 2, 6, and 9. Alternatively, as in condition 4 of FIG. 8, second electrode body portion 31a may be disposed so as to straddle the opening of discharge portion 17 in a large number of lines, that is, in a radial direction. As described above, in a case where linear second electrode body portion 31a is disposed so as to straddle the opening of discharge portion 17, it is preferable that an inner diameter of the opening of discharge portion 17 or a thickness of a line of linear second electrode body portion 31a is set, so that the opening ratio of the circumscribed circle of opening 311a is 50% to 87%, inclusive, in a remaining region of the opening of discharge portion 17.

Operation

Figure 5:
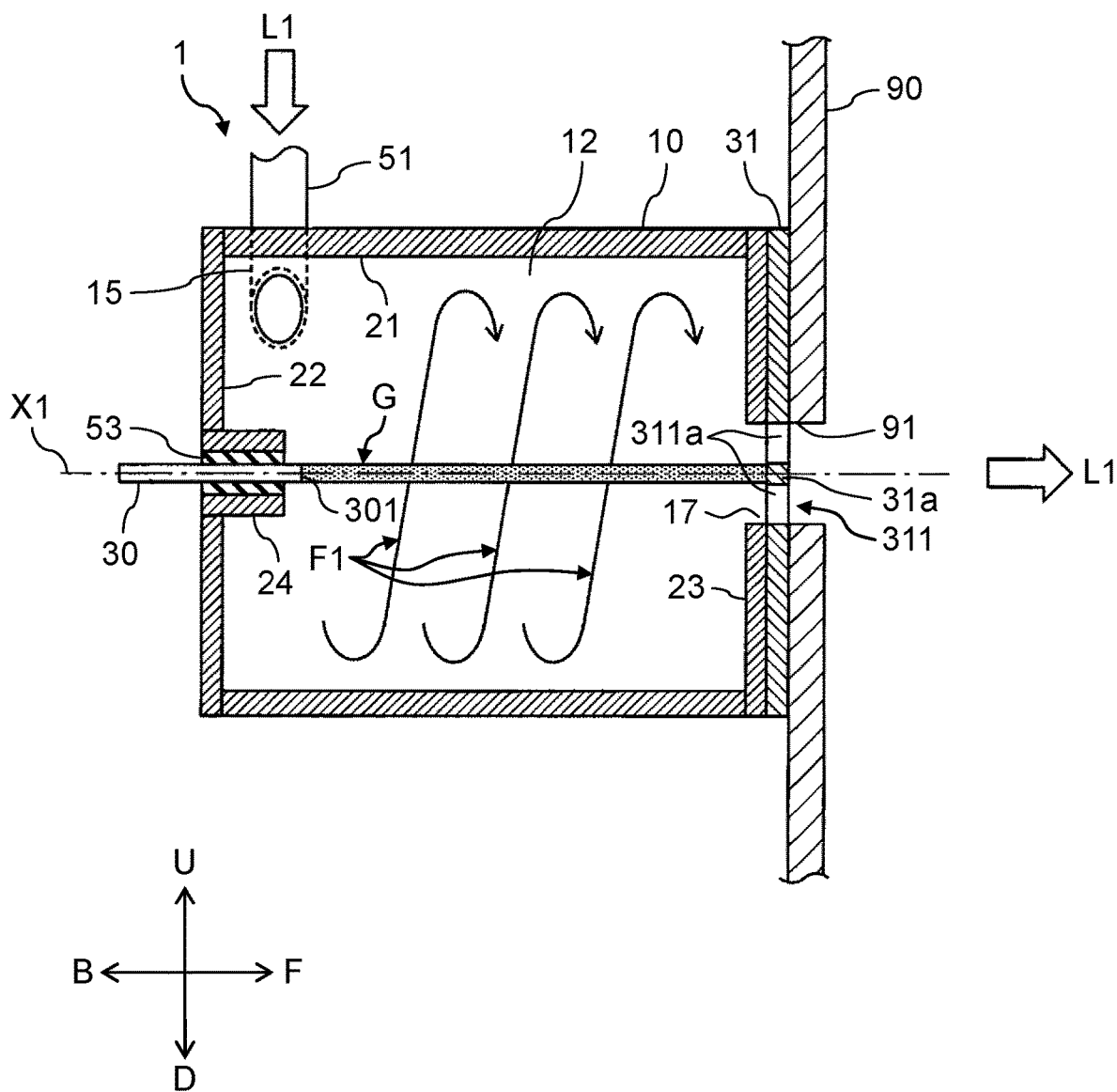
FIG. 5 is a side sectional view illustrating a state where a swirling flow is generated in a processing tank and a voltage is not applied in the liquid processing apparatus according to Exemplary Embodiment 1.

Next, an operation of liquid processing apparatus 1 will be described. Hereinafter, for the sake of convenience of explanation, a state where gas phase G is generated inside processing tank 12 (FIG. 5) and a state where plasma P is generated by applying the pulse voltage from power supply 60 to gas phase G (FIG. 6) are described in separated drawings. FIG. 5 is a side sectional view illustrating a state where swirling flow F1 is generated inside processing tank 12 and no pulse voltage is applied.

First, as illustrated in FIG. 5, when liquid (for example, water) L1 is introduced from introduction portion 15 into processing tank 12 at a predetermined pressure by sucking liquid L of storage tank 90 via a pump or the like from tap water or by a pump, liquid L1 moves from introduction portion 15 toward the right side of FIG. 5 while generating swirling flow F1 along first inner wall 21. Swirling flow F1 moving toward the right side of FIG. 5 while swirling moves toward discharge portion 17.

Due to swirling flow F1, a pressure in the vicinity of central axis X1 drops to a saturated water vapor pressure or less, a part of liquid L1 vaporizes, and gas phase G is generated in the vicinity of central axis X1. Gas phase G is generated in a vicinity of a swirl center, specifically, an inner end of first electrode 30, that is, from right end portion 301 of first electrode 30 of FIG. 5 to second electrode 31 along central axis X1. That is, gas phase G extends from right end portion 301 so as to come into contact with second electrode body portion 31a of the center of second electrode 31.

Gas phase G swirls in the same direction as swirling flow F1 due to swirling flow F1 with which gas phase G comes into contact. Swirling gas phase G receives a resistance of the liquid in storage tank 90 in the vicinity of discharge portion 17, thereby being sheared into micro bubbles or ultra-fine bubbles (nano-bubbles) and being diffused from discharge portion 17 to storage tank 90 via intake 91 connected to discharge portion 17.

Figure 6:
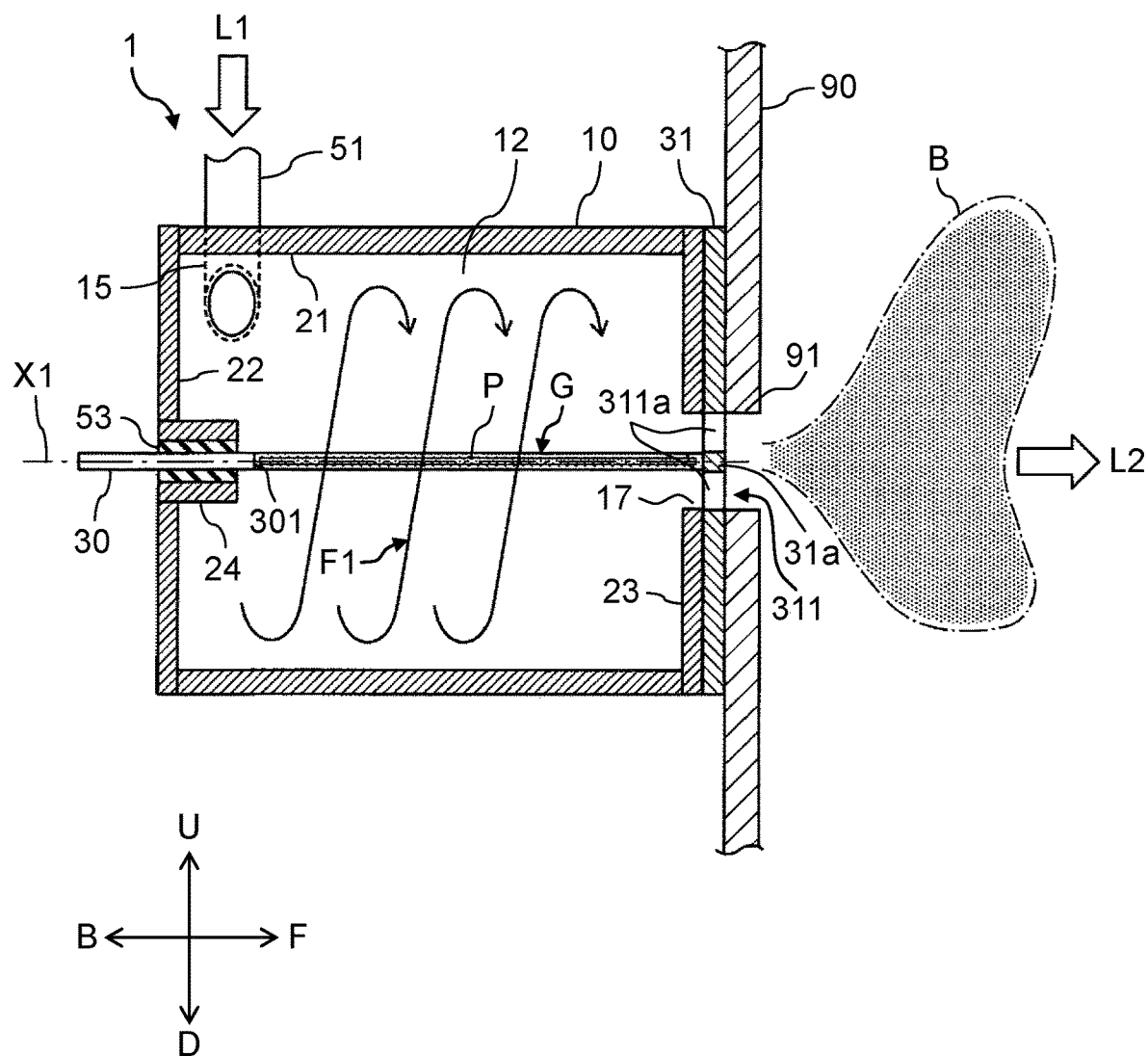
FIG. 6 is a side sectional view illustrating a state where the swirling flow is generated in the processing tank and a voltage is applied in the liquid processing apparatus according to Exemplary Embodiment 1.

FIG. 6 is a side sectional view illustrating a state where swirling flow F1 is generated inside processing tank 12 and a pulse voltage is applied from power supply 60. As illustrated in FIG. 6, in a state where gas phase G which is obtained by vaporizing liquid L1 is generated from first electrode 30 to second electrode 31, the pulse voltage of a high voltage is applied by power supply 60 between first electrode 30 and second electrode 31. When the pulse voltage of the high voltage is applied between first electrode 30 and second electrode 31, in gas phase G, plasma P is generated, thereby generating radicals (OH radicals or the like) or ions. The radicals or ions are dissolved from gas phase G to the swirling flow F1 side to decompose the contaminants dissolved in liquid L1. In addition, plasma P in gas phase G in the vicinity of discharge portion 17 receives the resistance of liquid L1 in storage tank 90, thereby generating a large amount of bubbles B containing OH radicals or the like. In this manner, processing liquid L2 which is processed by the OH radicals or the like generated by plasma P and in a state of including bubbles B containing the OH radicals or the like is discharged from discharge portion 17 toward storage tank 90.

That is, the OH radicals or the like generated by plasma P dissolve in processing liquid L2 in storage tank 90 directly or from within bubbles B. When a certain period of time has elapsed, processing liquid L2 in storage tank 90 is transformed into relatively stable hydrogen peroxide. Plasma P generated by applying the pulse voltage of the high voltage disappears when the application of the voltage is stopped.

When plasma discharge is generated, the ultraviolet light is generated at the same time. When contaminants or bacteria is irradiated with the generated ultraviolet light, it is possible to exert the decomposing and sterilizing action. Hydrogen peroxide water generated in the processing liquid is irradiated with the ultraviolet light, so that, as described above, the OH radicals or the like are generated and thereby the decomposing and sterilizing action is exerted.

Figure 7A:
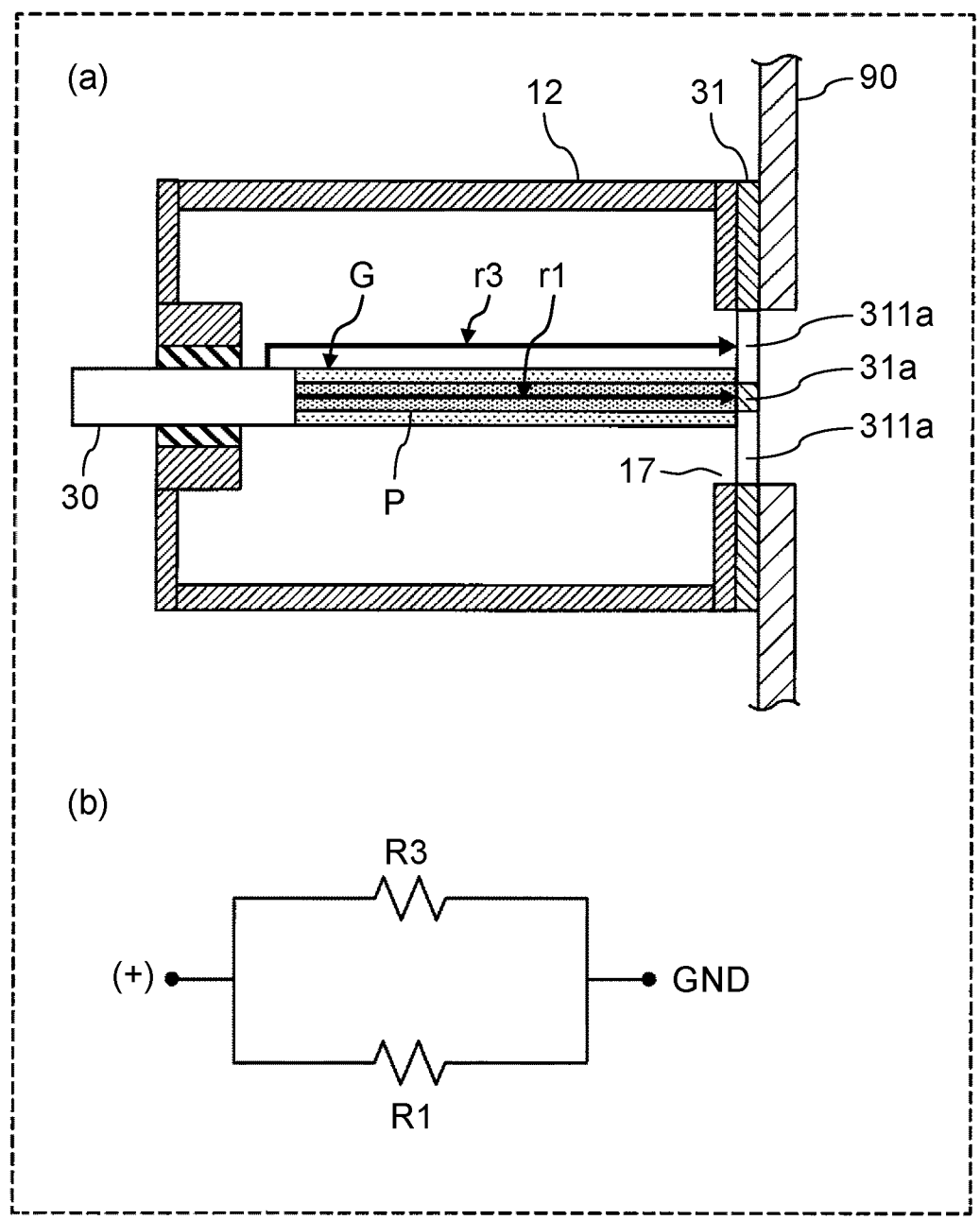
FIG. 7A is a view illustrating a current path and an equivalent circuit during discharge of the liquid processing apparatus according to Exemplary Embodiment 1.
Figure 7B:
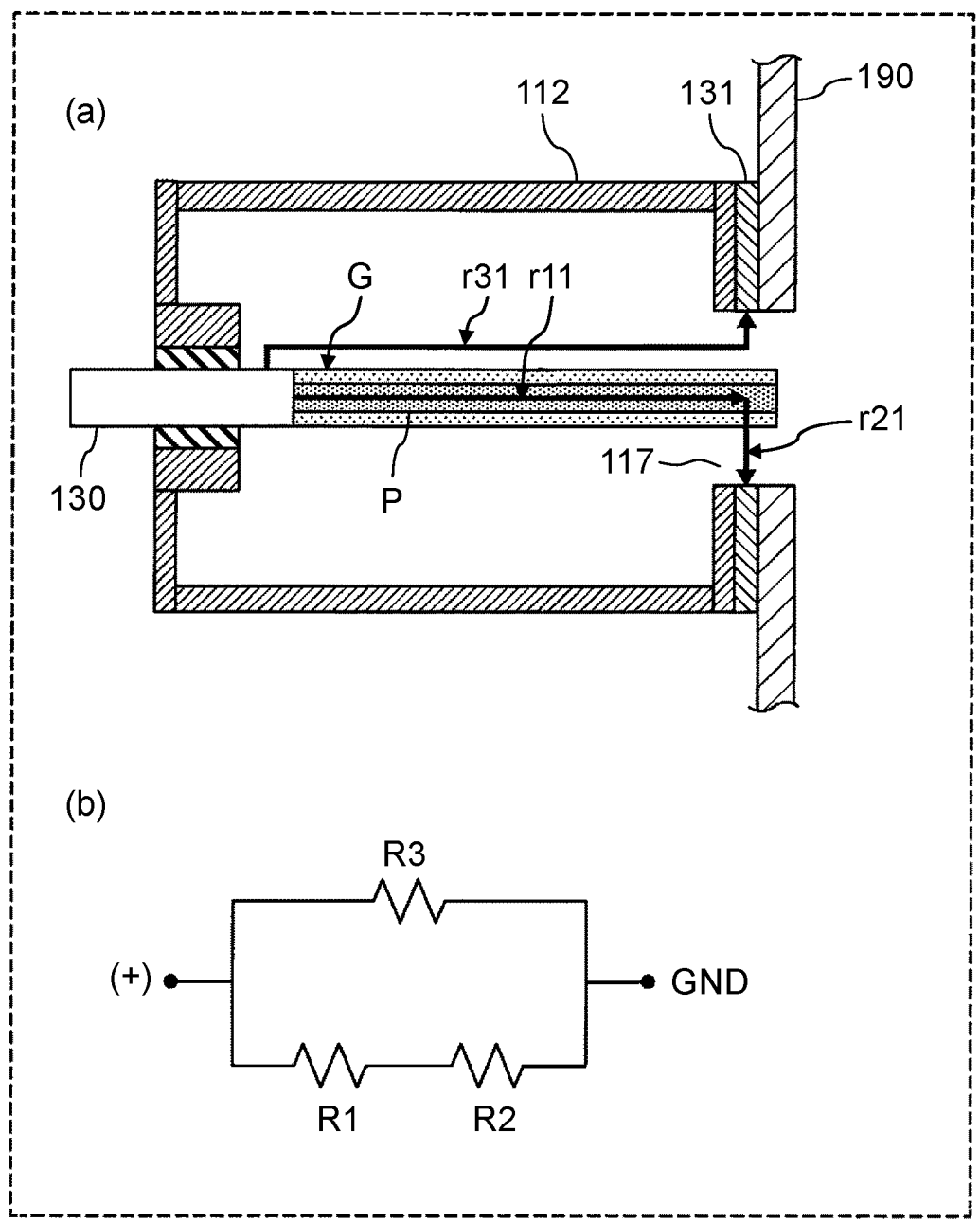
FIG. 7B is a view illustrating a current path and an equivalent circuit during discharge of a liquid processing apparatus of the related art.

In (a) of FIG. 7A, a current path during discharge of the liquid processing apparatus according to Exemplary Embodiment 1 is illustrated. In (b) of FIG. 7A, an equivalent circuit equivalent to the current path is illustrated. In addition, in (a) of FIG. 7B, a current path during discharge of the liquid processing apparatus according to the related art is illustrated. In (b) of FIG. 7B, an equivalent circuit equivalent to the current path is illustrated. In FIGS. 7A and 7B, R1 indicates a resistance of gas phase G, R2 indicates a resistance of a liquid from gas phase G to second electrode 131, and R3 indicates a resistance of the liquid from first electrode 30 to second electrode 31, or from first electrode 130 to second electrode 131. In (a) of FIG. 7A, the current path during discharge of the liquid processing apparatus of Exemplary Embodiment 1 is illustrated. Here, there are current path r1 that flows from first electrode 30 to second electrode body portion 31a of the center portion of second electrode 31 through gas phase G, and current path r3 that flows from first electrode 30 to second electrode 31 through the liquid without passing through gas phase G. The equivalent circuit can be expressed as illustrated in (b) of FIG. 7A and in this case, a combined resistance value can be expressed by the following equation (1).

$$\frac{R1*R3}{R1+R3} \quad (1)$$

Similarly, in (a) of FIG. 7B, the current path during discharge of the liquid processing apparatus of the related art is illustrated. Again, there are current path r11 that flows from first electrode 130 to a vicinity of second electrode 131 through gas phase G, current path r21 that flows through gas phase G at the end of current path r11 in the vicinity of second electrode 131 to second electrode 131 through the liquid in the vicinity of second electrode 131, and current path r31 that flows from first electrode 130 to second electrode 131 through the liquid without passing through gas phase G. The equivalent circuit thereof is as illustrated in (b) of FIG. 7B. In this case, a combined resistance value can be expressed by the following equation (2).

$$\frac{(R1+R2)*R3}{(R1+R2)+R3} \quad (2)$$

It can be seen that a combined resistance is smaller by the equation (3) which is a difference between equation (2) and equation (1) in the liquid processing apparatus according to Exemplary Embodiment 1 than that in the liquid processing apparatus of the related art. That is, loss of energy input from power supply 60 is reduced and the temperature rise of the liquid can be suppressed.

$$\frac{R2*(R3)^2}{(R1+R2+R3)*(R1+R3)} \quad (3)$$

Furthermore, in the liquid processing apparatus of the related art, in current path r11 and current path r21, resistance R1 of gas phase G and resistance R2 of the liquid from gas phase G to second electrode 131 are in series, so that only R1/(R1+R2) of a voltage applied between first electrode 130 and second electrode 131 from power supply 60 is applied to gas phase G.

On the other hand, in Exemplary Embodiment 1, in current path r1, an entire voltage applied between first electrode 30 and second electrode 31 is applied to gas phase G extending between first electrode 30 and second electrode 31, and is not applied to liquid L1. Therefore, dielectric breakdown is likely to occur and the plasma discharge can occur more stably.

In Exemplary Embodiment 1, as illustrated in FIG. 3, opening portion 311 provided at the center portion of second electrode 31 has a shape to be constituted of four fan-shaped openings 311a disposed in a rotation symmetry with respect to second electrode 31 with central axis X1 as the center. However, the number of fan-shaped openings 311a which can obtain the effect of the exemplary embodiment is not limited to four. FIG. 8 illustrates a table for explaining an effect of a result of whether or not a relationship between the number (opening ratio) of fan-shaped openings 311a and the plasma discharge is stably generated. In FIG. 8, a case where the plasma discharge can be stably generated is represented by "0", and a case where the plasma discharge cannot be stably generated is represented by "X". Here, one circular through-hole having a diameter of 3 mm is formed in second electrode 31 and Condition 1 is set in a case where a metal wire is not disposed (opening ratio is 100%). A plurality of metal wires having respective wire widths of 0.3 mm, 0.6 mm, and 1 mm are disposed to one circular through-hole having the diameter of 3 mm formed in second electrode 31, and thereby as being represented by Conditions 2 to 10, 9 types of opening portions 311 having different number and the opening ratio of fan-shaped openings were created and evaluated.

Condition 1 is a case of the liquid processing apparatus of the related art. In this case, although discharge can be performed, the temperature of the liquid (for example, water) rises as described above.

Conditions 2 to 5 are a case where a line width of a metal body is 0.3 mm, and in a case where the number of the fan-shaped openings is 6 or less (opening ratio is 87.3% to 61.9%), the plasma discharge could be stably generated while suppressing a rise of a water temperature.

Conditions 6 to 8 are a case where the line width of the metal body is 0.6 mm, and in a case where the number of the fan-shaped openings is 4 or less (opening ratio is 49.4% to 74.7%), stable plasma discharge could be confirmed.

Conditions 9 and 10 are a case where the line width of the metal body is 1.0 mm, and in a case where the number of the fan-shaped openings is 2 (opening ratio is 58.4%), stable discharge could be confirmed.

From the results described above, it was seen that the condition for generating a stable plasma discharge without occurrence of the rise of the water temperature is not determined by the number of fan-shaped openings 311a but by the opening ratio with respect to the circumscribed circle of opening 311a which is disposed in a rotation symmetry with central axis X1 as the center and the opening ratio is preferably 50% to 87%, inclusive.

It is preferable that opening portion 311 is provided in second electrode 31 with a simple structure. However, instead of such a configuration, it is possible to has a configuration such that the circumscribed circle of opening 311a is formed larger in second electrode 31 than a circumscribed circle in which an opening ratio is 50% to 87%, inclusive, the opening of discharge portion 17 is formed smaller than the circumscribed circle of opening 311a, and as a result, the opening ratio to the circumscribed circle of opening 311a exposed from the opening of discharge portion 17 is 50% to 87%, inclusive.

According to Exemplary Embodiment 1 described above, since plasma P generated in gas phase G comes into direct contact with both first electrode 30 and second electrode 31, it is possible to suppress the leakage current only flowing through liquid L1 without passing through plasma P. As described above, since the leakage current is small, plasma P can be efficiently generated, liquid L1 can be processed with high energy efficiency, and plasma P can be stably generated for a long time by suppressing the rise of the water temperature. That is, even in a case where the liquid is processed continuously while being circulated, the pressure of gas phase G does not rise and plasma P is stabilized, so that the facility can be operated for a long time.

Figure 9:
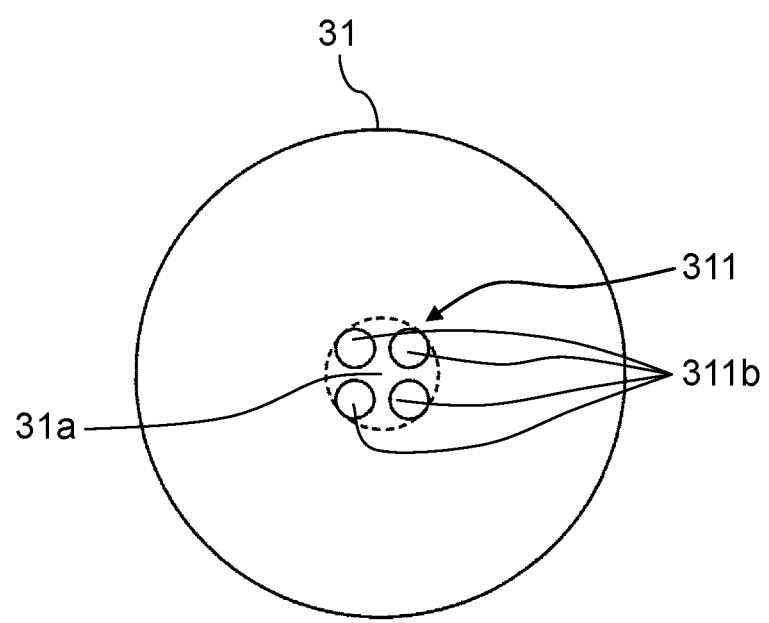
FIG. 9 is a view illustrating a modification example of the second electrode according to Exemplary Embodiment 1.

The number of fan-shaped openings 311a forming opening portion 311 in FIG. 8 is only an even number, but the same result can be obtained as long as the opening ratio is 50% to 87%, inclusive, even in a case of an odd number. In this case, for the arrangement of fan-shaped openings 311a, in order to uniformity form gas phase G, it is preferable that fan-shaped openings 311a are arranged in a point symmetry from central axis X1. Furthermore, the shape of opening 311a is not limited to the fan shape and as long as the opening ratio to the circumscribed circle of a plurality of openings 311a which are arranged with central axis X1 as the center is 50% to 87%, inclusive, the same effect can be obtained even if opening portion 311 is formed by a plurality of circular openings 311b as illustrated in FIG. 9.

Figure 10:
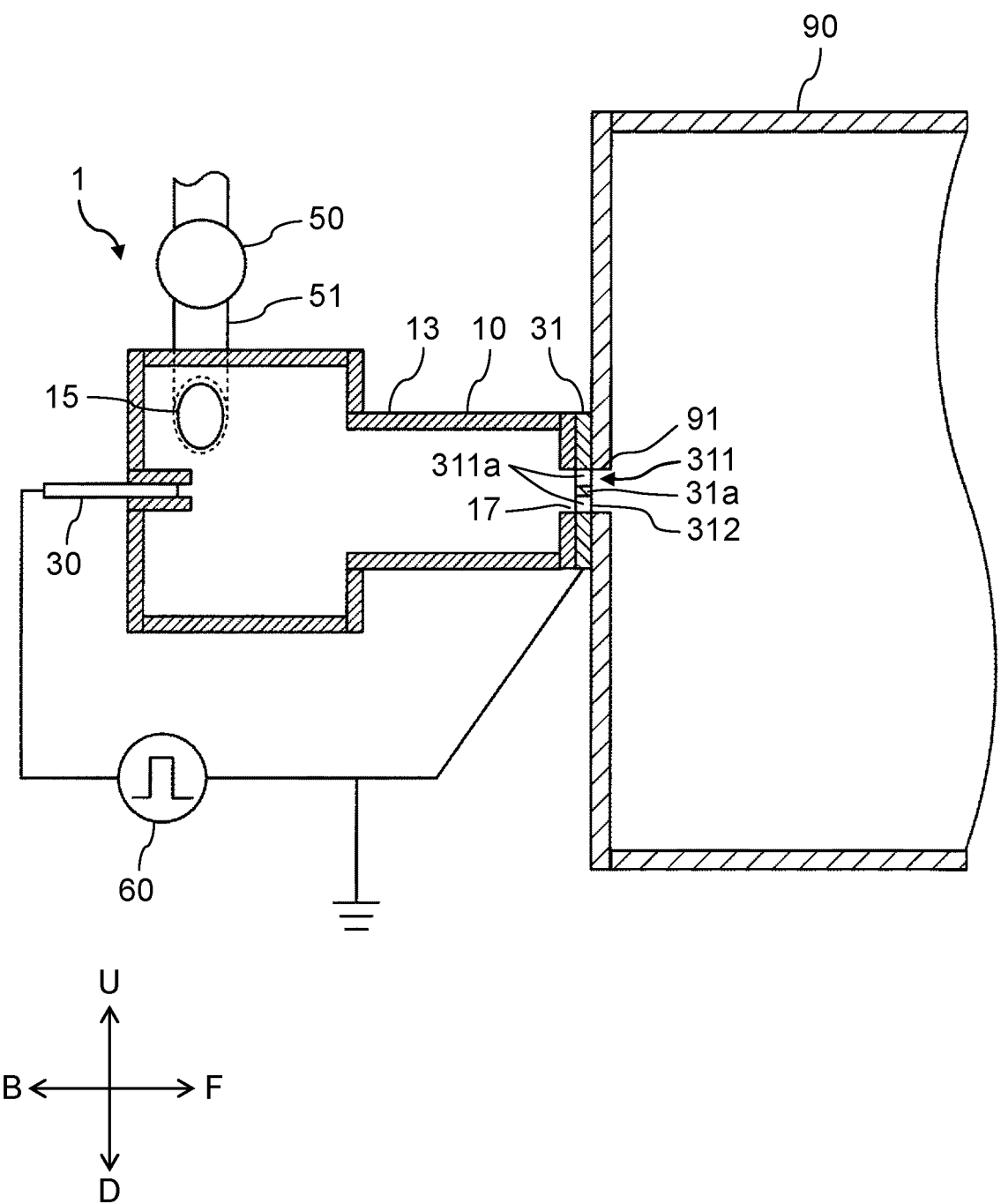
FIG. 10 is a view illustrating a processing tank in which cylinders having different radii are combined in the liquid processing apparatus according to Exemplary Embodiment 1.

Although processing tank 12 has a simple cylindrical shape, it is possible to adopt various shapes as long as it is a cylindrical processing tank having one closed end portion having a circular cross-sectional section. For example, even in processing tank 13 in which cylinders having different radii are combined as illustrated in FIG. 10, and processing tank 14 having a conical shape illustrated in FIG. 11, the same effect as that of Exemplary Embodiment 1 can be obtained.

Exemplary Embodiment 2

In Exemplary Embodiment 1, second electrode 31 is constituted of a plate-shaped metal member and an entirety thereof comes into direct contact with liquid L1. Therefore, there is a current path flowing from first electrode 30 to second electrode 31 through liquid L1 without passing through gas phase G. However, the electrode only at the portion coming into contact with gas phase G is exposed in second electrode 31 and the other portion is covered with an insulating film, so that it is possible to suppress the current flowing to second electrode 31 through liquid L1 without passing through gas phase G. With the configuration, it is possible to suppress the rise of the water temperature while performing the liquid processing more efficiently and to stably generate the plasma for a long time.

Figure 13:
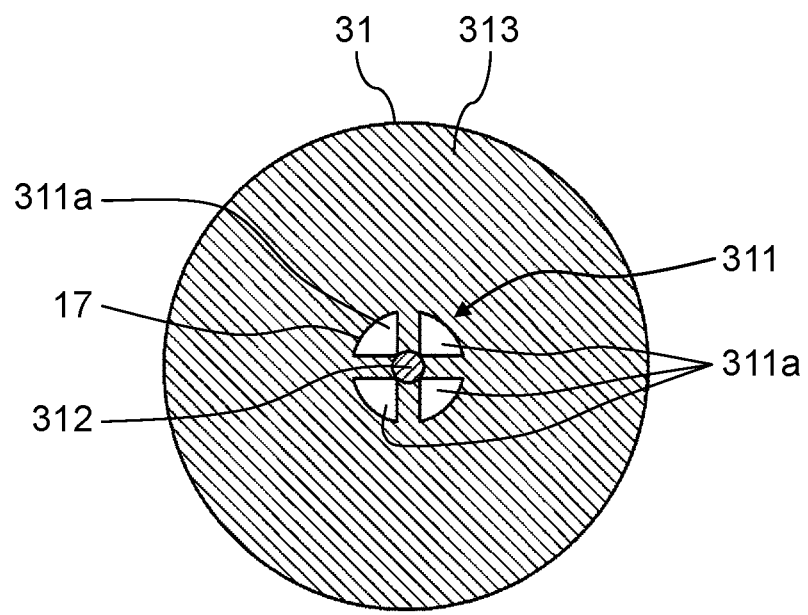
FIG. 13 is a front view of a second electrode according to Exemplary Embodiment 2.
Figure 14:
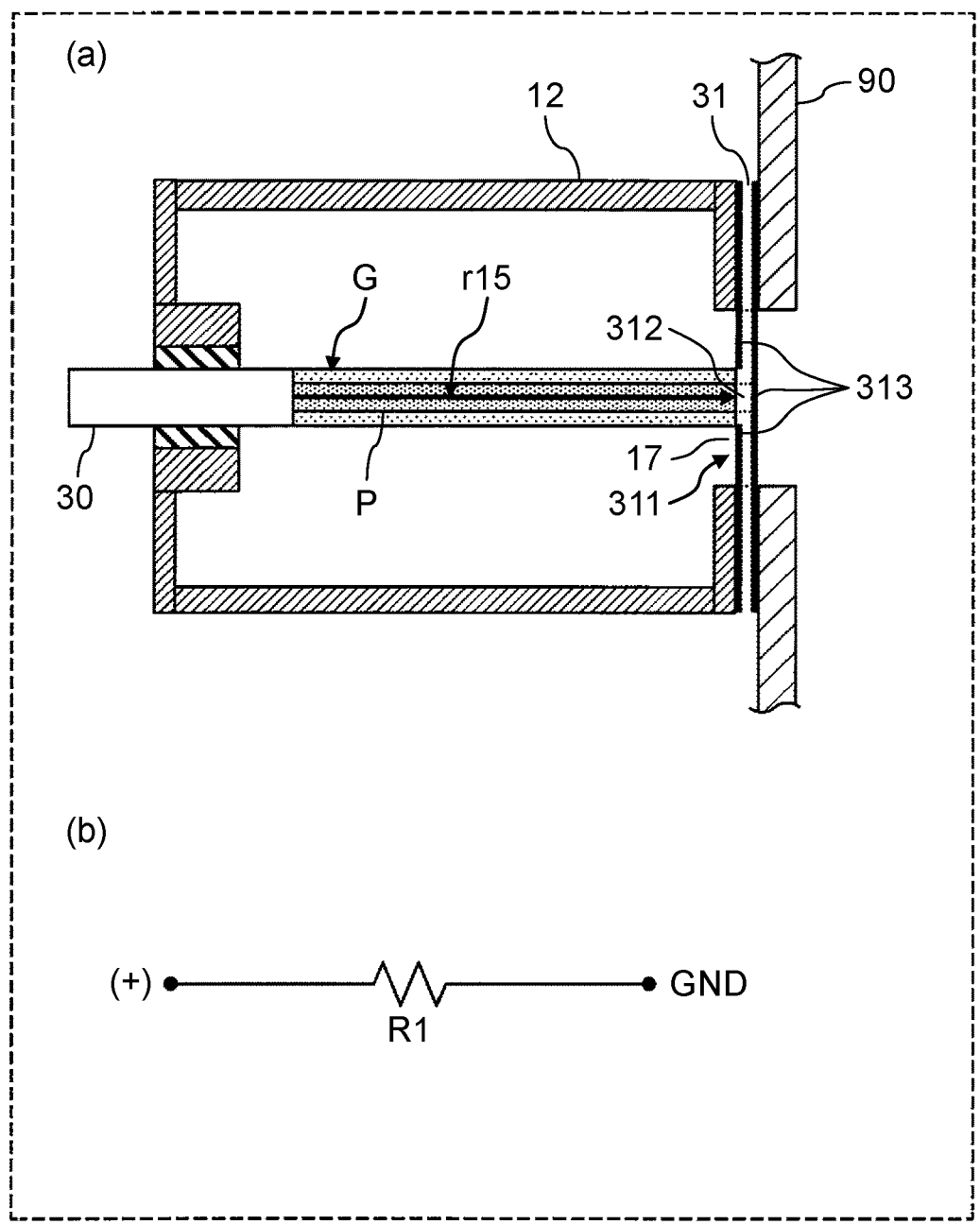
FIG. 14 is a view illustrating a current path and an equivalent circuit during discharge of the liquid processing apparatus of Exemplary Embodiment 2.
Figure 16:
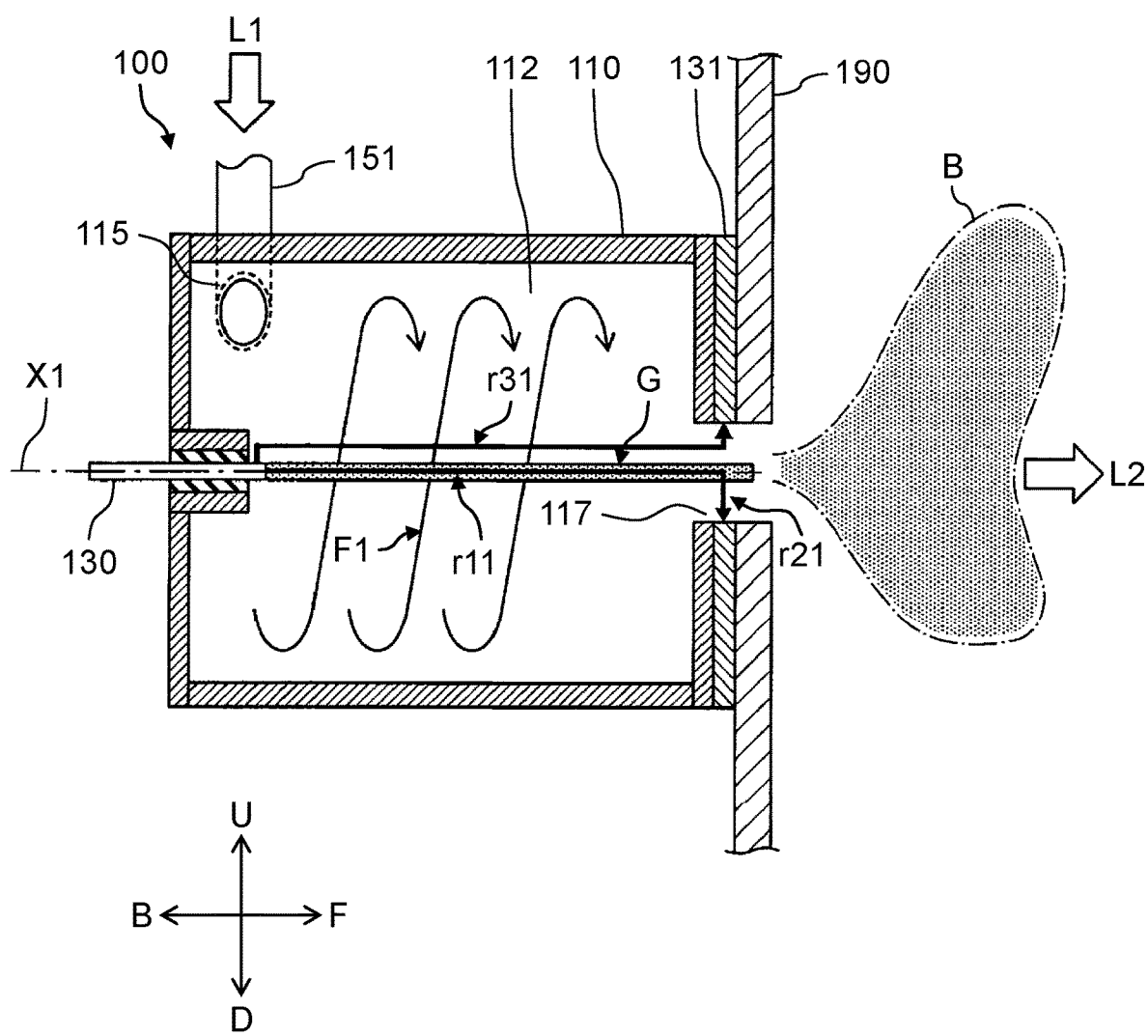
FIG. 16 is a side sectional view illustrating a state where a swirling flow is generated inside a processing tank and a voltage is applied in the liquid processing apparatus of the related art.

FIG. 12 illustrates an apparatus configuration of Exemplary Embodiment 2 of the disclosure and FIG. 13 illustrates a front view of a second electrode of Exemplary Embodiment 2 of the disclosure. A difference from Exemplary Embodiment 1 is that there are insulating film 313 and circular metal exposed portion 312 (electrode exposed portion). Insulating film 313 is provided on a surface of second electrode 31 on a first electrode side excluding opening portion 311. Circular metal exposed portion 312 is exposed from insulating film 313 at a center of the surface of second electrode 31 on the first electrode side. Since insulating film 313 and metal exposed portion 312 exist, a current flows only through metal exposed portion 312 in second electrode 31. As illustrated in FIGS. 12 and 14, insulating film 313 may be disposed on an entire surface of second electrode 31 on a side opposite to the surface of the first electrode side. In FIG. 13, in order to distinguish insulating film 313, metal exposed portion 312, and opening 311a, insulating film 313 and metal exposed portion 312 are illustrated so as to be distinguished from each other with hatching different from each other.

FIG. 14 illustrates a current path an equivalent circuit equivalent to the current path during discharge of the liquid processing apparatus of Exemplary Embodiment 2. In (a) of FIG. 14, current path r15 during discharge of the liquid processing apparatus in Exemplary Embodiment 2 is illustrated. Since metal exposed portion 312 of second electrode 31 is covered with gas phase G, only current path r15 flowing from first electrode 30 to second electrode 31 through gas phase G exists. In other words, a current path directly flowing from first electrode 30 to second electrode 31 through liquid L1 does not exist. In this case, the equivalent circuit can be represented as illustrated in (b) of FIG. 14 and R1 is a resistance of gas phase G.

According to Exemplary Embodiment 2 described above, since there is no current flowing through liquid L1, it is possible to suppress the rise of the water temperature while performing the liquid processing more efficiently and stably generate plasma P for a long time.

Although the exemplary embodiments of the present disclosure are described above, the above-described exemplary embodiments are merely examples for implementing the present disclosure. Therefore, the present disclosure is not limited to the above-described exemplary embodiments, and the above-described exemplary embodiments can be appropriately modified and implemented without departing from the spirit of the disclosure. For example, arbitrary exemplary embodiments or modifications of the above-described various exemplary embodiments or modifications are suitably combined, so that it is possible to achieve the respective effects possessed by them. In addition, combinations of the exemplary embodiments, combinations of the examples, or combinations of the exemplary embodiments and the examples are possible, and combinations of features in different exemplary embodiments or examples are also possible.

According to the liquid processing apparatus of the disclosure, since the plasma generated in the gas phase comes into contact with both the first electrode and the second electrode, it is possible to reduce the leakage current flowing only through the liquid without passing through the plasma. Since the leakage current is small, it is possible to suppress the rise in the temperature of the liquid and stably generate the plasma for a long time. In addition, since the leakage current is small, it is possible to perform the liquid processing with high energy efficiency. Furthermore, since it is possible to suppress the rise of the temperature of the liquid, even in a case where the liquid is continuously processed while being circulated, and the pressure of the gas phase does not rise and the plasma is stabilized. Therefore, the facility can be operated for a long time.

The liquid processing apparatus of the present disclosure is capable of causing the decomposing and sterilizing action caused by the direct contact of contaminants or bacteria contained in the liquid with plasma by generating the plasma in the liquid, and the decomposing and sterilizing action by the ultraviolet light, radicals, or the like caused by the plasma discharge at the same time. Therefore, it is possible to process the liquid, and to use the liquid processing apparatus for sterilization, deodorization, various environmental improvement, or the like.

What is claimed is:

1. A liquid processing apparatus comprising:
   a cylindrical processing tank of which one end portion is closed and which has a circular cross-sectional shape;
   a liquid introduction port that is disposed on a first end side of the cylindrical processing tank, causes a liquid to swirl in the cylindrical processing tank by introducing the liquid into the cylindrical processing tank in a tangential direction of the cylindrical processing tank, and generates a gas phase in a swirling flow of the liquid;
   a discharge portion that is disposed at a second end of the cylindrical processing tank and discharges the liquid introduced from the liquid introduction port;
   a rod-shaped first electrode that is disposed at a first end on a central axis of the cylindrical processing tank;
   a second electrode that is disposed so as to be exposed to the discharge portion of the cylindrical processing tank; and
   a power supply that applies a voltage between the rod-shaped first electrode and the second electrode to generate plasma in the gas phase between the rod-shaped first electrode and the second electrode, wherein
   the second electrode is a plate-shaped electrode disposed at the second end of the cylindrical processing tank, and
   the second electrode includes an opening portion constituted of a plurality of openings disposed in a rotation symmetry with respect to the central axis of the cylindrical processing tank as a center.

2. The liquid processing apparatus of claim 1,
   wherein an opening ratio of the opening portion with respect to a circumscribed circle of the plurality of openings constituting the opening portion is 50% to 87%, inclusive.

3. The liquid processing apparatus of claim 1,
   wherein in the second electrode, a surface on a first electrode side except for the opening portion is covered with an insulating film, and an electrode exposed portion capable of being electrically conducted is provided to only a center portion of a surface facing the rod-shaped first electrode.

4. The liquid processing apparatus of claim 2,
   wherein in the second electrode, a surface on a first electrode side except for the opening portion is covered with an insulating film, and an electrode exposed portion capable of being electrically conducted is provided to only a center portion of a surface facing the rod-shaped first electrode.

* * * * *